United States Patent [19]

Bradlee

[11] Patent Number: 4,794,773
[45] Date of Patent: Jan. 3, 1989

[54] METHOD OF MEASURING CAMBER

[75] Inventor: Charles R. Bradlee, Sidney, Ohio

[73] Assignee: Monarch Machine Tool Company, New Bremen, Ohio

[21] Appl. No.: 79,305

[22] Filed: Jul. 29, 1987

[51] Int. Cl.$^4$ .................. B21C 51/00; B26D 5/00; G01B 3/12; G01B 7/28

[52] U.S. Cl. .................. 72/12; 72/164; 83/367; 83/370; 83/72; 33/141 R; 33/142

[58] Field of Search ........ 72/164, 165, 160, 9, 72/12; 33/141 R, 141.5, 142, 533; 83/368, 72, 289, 370, 367, 373

[56] References Cited

U.S. PATENT DOCUMENTS

| | | | |
|---|---|---|---|
| 3,428,818 | 2/1969 | Grebe et al. | 72/12 |
| 3,570,735 | 3/1971 | Kurz | 83/367 |
| 3,596,489 | 8/1971 | Ball | 72/12 |
| 4,144,782 | 3/1979 | Lindstrom | 83/367 |
| 4,255,999 | 3/1981 | Davis | 83/367 |
| 4,454,738 | 6/1984 | Buta | 72/164 |
| 4,528,756 | 7/1985 | Ichihara | 33/142 |
| 4,541,317 | 9/1985 | Van Humbeeck et al. | 83/72 |
| 4,635,458 | 1/1987 | Bradlee | 72/165 |

*Primary Examiner*—Daniel C. Crane
*Attorney, Agent, or Firm*—Smith & Schnacke

[57] ABSTRACT

A method of measuring camber in a sheet of metallic material comprises the steps of displacing the sheet between fixed guides in a plane perpendicular to the width of the sheet such that a point on a center of the sheet travels a predetermined distance, measuring the length of the sheet adjacent a first longitudinal edge thereof which moves past a datum line when the sheet is displaced the predetermined distance and generating a signal having a value A proportional to the length, measuring a length of the sheet adjacent to a second, opposite longitudinal edge which moves past the datum line when the sheet is displaced the predetermined distance and generating a signal having a value B proportional to the second edge length, and calculating camber at the first edge, expressed as a radius of curvature $R_C$ of the sheet, by the equation:

$$R_C = W\left(\frac{A}{A-B}\right),$$

where W equals the width of the sheet.

4 Claims, 4 Drawing Sheets

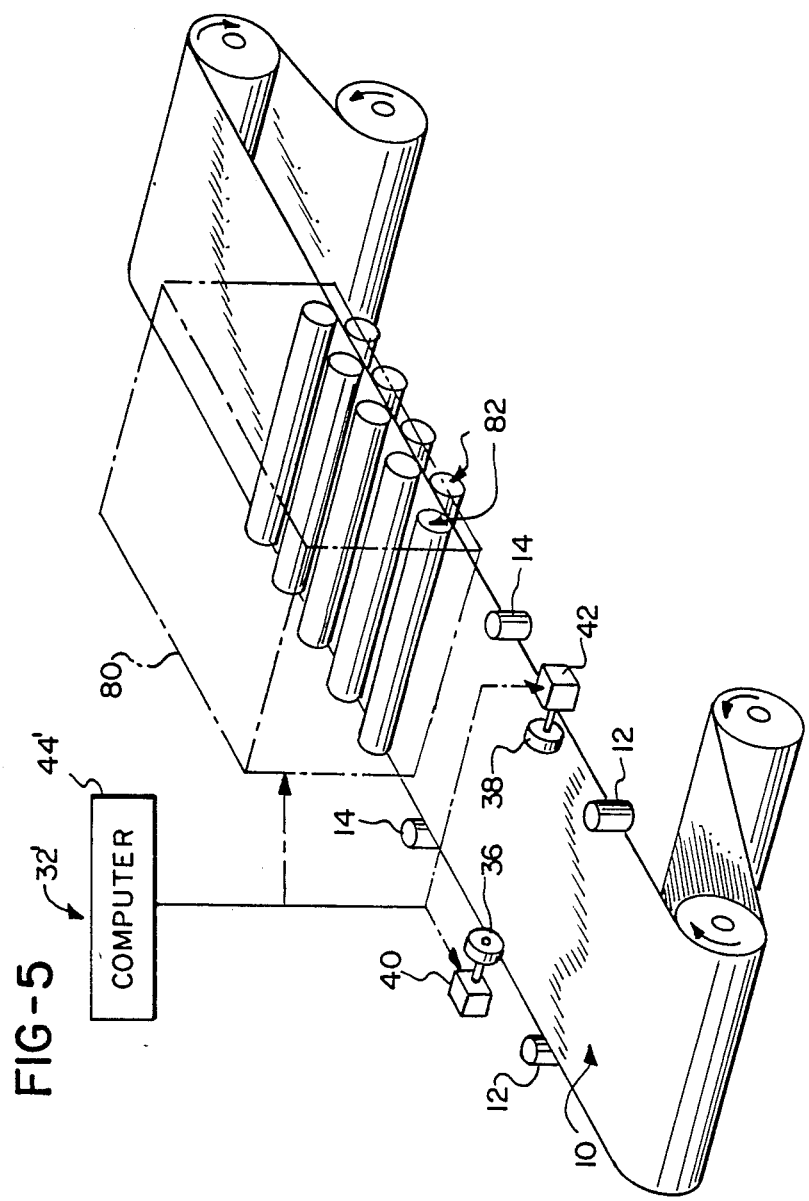

METHOD OF MEASURING CAMBER

BACKGROUND OF THE INVENTION

The present invention relates to camber measuring methods, and more particularly, to non-destructive methods of measuring camber in sheet metal.

Sheet metal normally is formed, transported, and sold in large coils. In order to fabricate goods from such sheet metal, it is first necessary to uncoil an appropriate length of sheet metal and cut a sheet to size. If the strip unrolled from the sheet metal coil were perfectly flat and straight, sheet metal sections in the shape of squares, rectangles or parallelograms could be formed simply by shearing the strip at an appropriate angle relative to the longitudinal dimension of the strip.

However, in addition to other anomalies such as non-homogeneity and uneven thickness across its width and along its length, the strip of sheet metal in the coil contains "camber." Camber occurs in a sheet when one longitudinal side of the strip, or a portion of the strip, is longer than the opposing longitudinal side, which causes the strip to curve to the left or right relative to its central longitudinal axis. Although camber in a strip of sheet metal typically is very slight in comparison to the width or length of the strip, it is sufficient to cause problems when the strip is unrolled from the coil and sheared to form individual metal sheets. Many attempts have been made to eliminate camber from strips of sheet metal, but it almost inevitably appears in any given coil, and may cause the sheet to bend to the right or left in varying places along its length.

Since sheet metal having a minimal amount of camber is more expensive to produce than sheets having a greater amount of camber, it desirable for economic reasons to utilize a strip of sheet metal having as much camber as can be tolerated in the finished product. If the shearing blade, which cuts individual sheets from a strip, is not pivoted an appropriate amount to compensate for camber in a sheet being cut from an uncoiled strip, a "rectangle" of sheet metal results in which none of the corners are right angles, and the diagonals of the sheet are not equal in length. Such a sheet must be trimmed excessively to make it sufficiently "square" for use. This squaring generates an unacceptable amount of scrap.

However, if either the incoming sheet or the shear blade is pivoted so that the shear blade lies along a radius passing through the center of curvature of the cambered strip, a section of sheet metal can be cut from a strip which, although not perfectly square, is such that all the corners are right angles and the diagonals are equal in length. Provided the camber of the sheet section cut does not exceed reasonable limits, a sheet having this specific geometry is acceptable for most applications.

Unfortunately, since a single strip of coiled sheet metal may have camber in varying degrees to the left or right, if at all, it may necessary to reposition the shearing blade for each cut to form successive sheets of metal having the aforementioned geometry. Attempts have been made to determine the camber of a sheet on a continuous basis. For example, an apparatus having three photoelectric cells is used in which the light beams of the cells determine the physical edge of a strip of sheet metal, and from those three points an arc is determined. The shearing blade is positioned to lie along the radius of curvature of the arc to form the cut.

Similarly, other devices incorporate three guide rolls which contact an edge of the sheet, and their positions are used to calculate an arc from which the radius of curvature line is derived.

A disadvantage with these types of devices is that the strip of sheet metal having camber usually is not formed such that the edges are in the form of perfect arcs, so that the derivation of the radius of curvature is an imperfect approximation. Furthermore, the guide rolls which guide the strip to the shear blade may deform the edges of the sheet and thereby throwoff the calculations made by these devices.

Accordingly, there is a need for an apparatus which is capable of determining the camber in strip sheet metal in the form of a radius of curvature of the strip on a continuous basis, so that camber in which the sheet veers to the right or left, if at all, can be detected. Furthermore, there is a need for a method of determining the camber of a strip of sheet metal without contacting the sides of the sheet which may be deformed by guide rolls and therefore present a false picture of the camber of the entire sheet.

SUMMARY OF THE INVENTION

The present invention is a method of determining camber in a strip of sheet metal which comprises the steps of displacing the sheet in a path between fixed guides such that a point on a center of the sheet travels a predetermined distance past a datum line perpendicular to the path, measuring the lengths of the sheet adjacent to its longitudinal edges which move past the datum line when the sheet is displaced the predetermined distance, and calculating the camber by comparing the difference in the lengths of the two longitudinal edges. The measuring steps include the steps of generating signals having a value A proportional to the first edge length and a value B proportional to the second edge length. Accordingly, the camber of the sheet, expressed as a radius of curvature $R_c$ of the sheet at the first edge, is defined by the equation:

$$R_c = W\left(\frac{A}{A-B}\right)$$

where W is the width of the sheet between the measuring wheels.

In the preferred embodiment of the invention, the measuring steps each include the step of bringing measuring wheels into contact with the sheet adjacent to its longitudinal edges and generating pulses proportional to an amount of rotation of the wheels. The number of pulses may be given as the values of A and B in the aforementioned equation since these values are expressed as a dimensionless ratio in that equation.

The appartaus utilized in performing the method includes a pair of measuring wheels which contact the surface of the sheet to be cut adjacent to the longitudinal edges of the sheet, analog to digital converters for generating signals proportional to the rotation of the measuring wheels, and a computer control for calculating the camber from these data and actuating a cylinder motor to pivot a shearing blade an appropriate amount to compensate for the camber. In another embodiment, the computer control pivots guide rolls constraining the strip to position the strip at the desired angle to a nonpivoting blade.

While these devices do not generate sheet metal which is perfectly square or rectangular, the sheets cut with the method and apparatus of the invention have right angle corners and diagonals of equal lengths, although the end edges are not parallel to each other. Despite this deviation from a perfect geometric shape, sheets having this shape are acceptable for most applications.

In another embodiment, the computer actuates a leveling apparatus, such as that disclosed in Bradlee U.S. Pat. No. 4,635,458, the disclosure of which is incorporated herein by reference. The computer would actuate the work rolls of that apparatus to lengthen the shorter side of the sheet and thereby eliminate or greatly reduce the camber.

Accordingly, it is an object of the present inventon to provide a method of measuring camber in a strip of sheet metal which does not require the sheet metal to be cut into sheets in order to determine camber; a method of determining camber in which the edges of the sheets are not utilized; a method of determining camber in sheet metal in which the camber of small or large lengths of the sheet can be determined without modifying the method or apparatus of the invention; and a method of determining camber in a sheet which is relatively uncomplicated to perform and which yields accurate results.

Other objects and advantages of the present invention will be apparent from the following description, the accompanying drawings, and the appended claims.

BRIEF DESCRIPTION OF THE DRAWINGS

FIG. 5 is a schematic representation of a strip of sheet metal being worked by a leveling apparatus according to the method of the invention.

DETAILED DESCRIPTION OF THE PREFERRED EMBODIMENT

Figure 1:
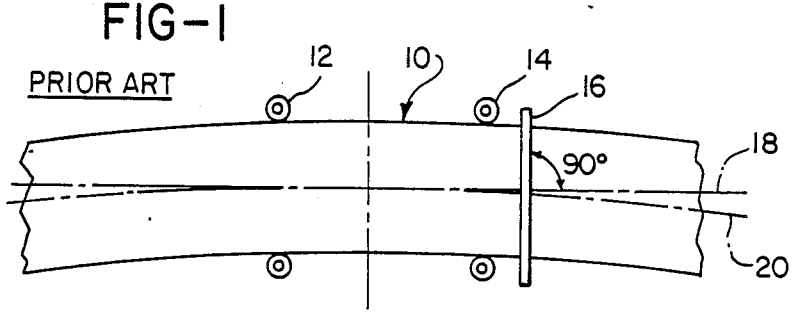
FIG. 1 is a schematic plan view of a prior art process for cutting sheet metal from a continuous strip.

As shown in FIG. 1, a prior art method of cutting metal sheets from a strip of sheet metal 10 includes the steps of uncoiling the strip from a coil of sheet metal (not shown) and guiding the strip past pairs of guide rollers 12, 14 and beneath a shearing blade 16. The shearing blade is oriented at a 90° angle to a theoretical center line 18 of the strip assuming it passed between the rollers 12, 14 and was substantially straight. In actuality, however, should sheet 10 have camber as illustrated in FIG. 1 (and exaggerated greatly for purposes of illustration) its centerline would lie along line 20 which deviates from theoretical centerline 18 and lies along an arc.

Figure 2:
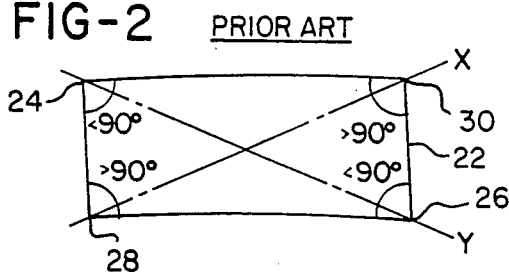
FIG. 2 is a schematic representation of a piece of sheet metal cut according to the process illustrated in FIG. 1.

Shearing the strip 10 with blade 16 results in the formation of a sheet 22 as shown in FIG. 2. Sheet 22 has generally a parallelogram shape in that corners 24, 26 are less than 90° and corners 28, 30 are greater than 90°. Furthermore, diagonals X and Y are not equal. In order to trim sheet 22 to make it suitable for standard applications, it is necessary to trim an unacceptable amount of waste from the periphery of the sheet.

Figure 3:
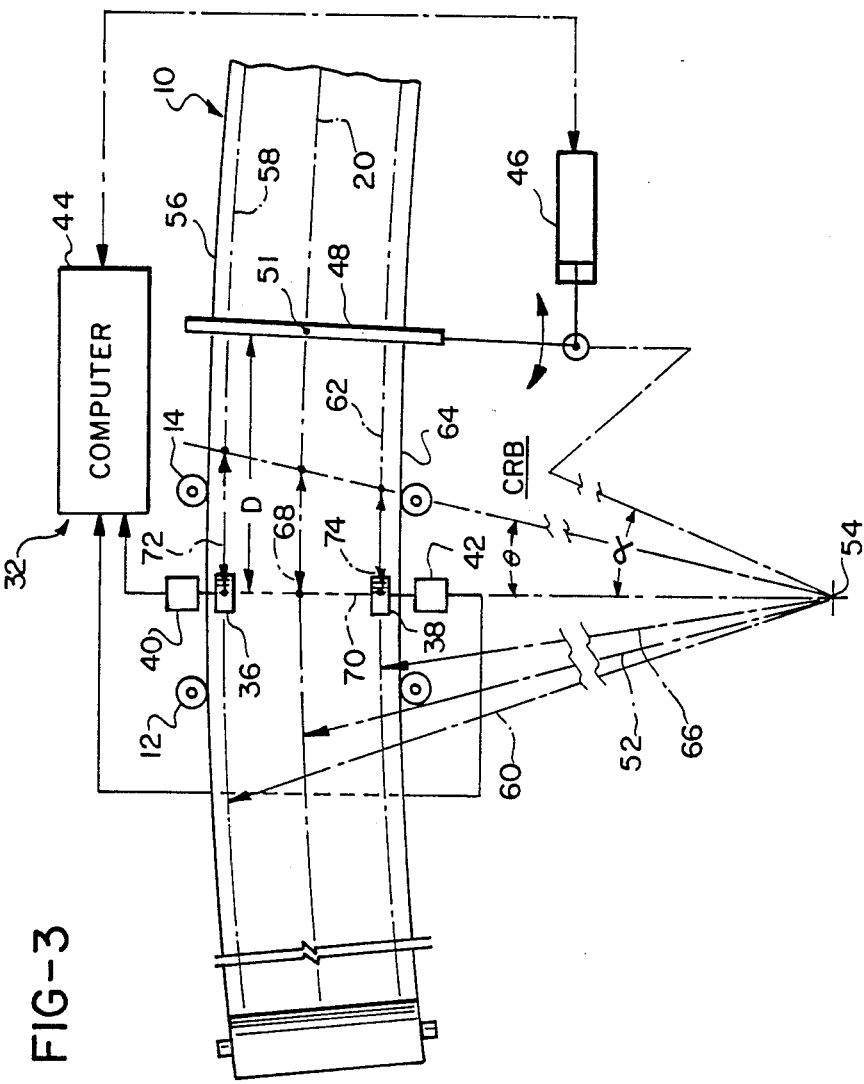
FIG. 3 is a schematic representation of an apparatus designed for performing the method of the invention.

The method of the invention is embodied in the apparatus generally designated 32 in FIG. 3. In a manner similar to the method shown in FIG. 1, a strip 10 of sheet metal is unwound from a coil 34 and payed out between pairs 12, 14 of opposing guide rolls. The apparatus 32 includes measuring wheels 36, 38 which contact the surface of the sheet 10 and are connected to pulse generators 40, 42. Pulse generators 40, 42 are connected to a computer 44 which actuates a double-acting cylinder motor 46 that pivots a shearing blade 48. In addition to the blade 48, or as an alternate system, the computer 44 may actuate a leveling apparatus 50 such as that disclosed in Bradlee U.S. Pat. No. 4,635,458, the disclosure of which is incorporated herein by reference.

The strip 10 in FIG. 3 has a camber such that the centerline 20 forms an arc having a radius of curvature 52 and center of curvature 54. Measuring wheel 36 is positioned adjacent to lateral edge 56 and contacts the upper surface of the sheet 10 to follow a path denoted by line 58. Line 58 describes an arc having a radius of curvature 60 and a center of curvature which coincides with center 54. Similarly, measuring wheel 38 contacts the upper surface of sheet 10 adjacent to lateral edge 64 and follows a path 62 which describes an arc having a radius of curvature 66 and a center of curvature coinciding with center 54.

In operation, the sheet 10 is urged a predetermined distance through the guide rolls 12, 14, thereby causing the measuring wheels 36, 38 to rotate predetermined numbers of revolutions. This is equivalent to stating that a point lying on the centerline 20 of the sheet 10 is displaced a predetermined distance 68 from a datum line 70 extending transversely of the sheet 10 and passing midway between guide rolls 12 and 14. Similarly, points lying on lines 58 and 62 are displaced distances represented by arrows 72, 74, respectively, from the datum 70. Denoting arrow 72 as a vector A, arrow 74 as vector B and arrow 68 as vector C, the equation for the radius of curvature $R_C$ of the sheet, denoted by arrow 52, at center line 20 is:

$$R_C = \frac{C}{\sin\theta} \tag{1}$$

where $\theta$ is the angle through which the points on lines 58, 60, 62 have traveled from datum 70 for this measurement. Since the angle $\theta$ typically is very small and the radii of curvature 60, 66, 52, denoted $R_A$, $R_B$, $R_C$, respectively, very great in proportion to the width W of the sheet 10, following assumptions can be made:

$$\sin\theta = \theta \tag{2}$$

$$w = R_A - R_B \tag{3}$$

$$C = \frac{(A + B)}{2} \tag{4}$$

Thus, $\sin\theta$ can be expressed as:

$$\sin\theta = \theta = \frac{(A - B)}{(R_A - R_B)} \tag{5}$$

and substituting equations (4) and (5) for C and $\sin\theta$ in equation (1) yields:

$$R_C = \frac{(A + B)(R_A - R_B)}{2(A - B)} \quad (6)$$

Since the difference in length between A and B is slight, it can be assumed that with minimal error that:

$$\frac{(A + B)}{2} = A \quad (7)$$

so that substituting equations (3) and (7) into (6) yields:

$$R_C = W\frac{A}{(A - B)} \quad (8)$$

Consequently, the camber of the strip 10, which is considered to be the radius of curvature of the center line 20 of the sheet, can be calculated from equation (18) provided the values of W, A and B are known. The value for W can be programmed into the computer, and the pulse generators 40, 42 will generate pulses proportional to the values for A and B. The computer 44 then solves for $R_C$ and uses this value to actuate cylinder motor 46 to position shearing blade 48 appropriately.

The computer 44 is programmed such that the shearing blade is pivoted about its center point 51 to lie along the radius of curvature of the strip 10. The value of this pivot angle α is calculated from $R_C$ and the distance from the center of the guide rolls 12 and 14 to the center of the shear 51;

$$\alpha = \frac{D}{R_C} \quad (9)$$

Figure 4:
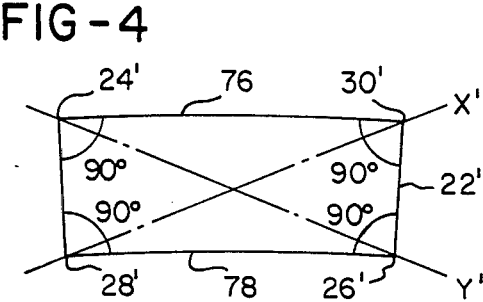
FIG. 4 is a schematic representation of a piece of sheet metal cut according to the method of the invention as illustrated in FIG. 3.

The resultant sheet 22', shown in FIG. 4, includes corners 24', 26', 28' and 30' which are all 90° angles. Furthermore, diagonals X' and Y' are equal to each other. However, the sheet 22' is not is perfectly square or rectangular since the opposing longitudinal edges 76, 78 are parallel to each other but are slightly arcuate and opposing transverse edges are at the angle α. However, a sheet having this configuration is acceptable for all but the highest quality products.

It should be noted that the method inherent in apparatus 32 can be performed on a continuous basis for incremental segments of the strip 10. With each segment, the computer 44 is capable of repositioning the shearing blade 48 to lie along a radius of curvature of the centerline 20. Should the sheet 10 curve in an opposite direction, so that measuring wheel 36 contacts the shorter side of the strip, equation (8) may be applied, which will result in a negative value for the radius of curvature, indicating that it lies on an opposite side of a sheet than that shown in FIG. 3.

The pulse generators are selected to provide a large number of pulses, on the order of 10,000, for a relatively short displacement of the strip 10, on the order of 2 to 3 feet. The output of both pulse generators 40, 42 is monitored by the computer until the count from one of them equals a preset number, such as the aforementioned 10,000, or the desired length of feed is reached.

In setting up the apparatus 32, it may be necessary to provide a factor to correct for mechanical imperfections in the measuring wheels 36, 38 and pulse generators 40, 42. This is accomplished by placing measuring wheels 36, 38 in tandem and feeding the strip 10 a predetermined distance. Since both wheels will measure the same length in this configuration, the value of this factor is set to give an output value of 0 when the wheels 36, 38 are in tandem. Thus equation (8) may be rewritten as:

$$R_C = W\frac{A}{(A - (B \times \text{Factor}))} \quad (10)$$

Since the angle α is directly proportional to the value $$\frac{A - (B \times \text{Factor})}{A}$$

and simple, inexpensive solid state microprocessor circuits are available to accept the signals for the value A and B and compute and display the value, it is within the scope of the invention to allow manual positioning of the shear blades 48 by reference to the value of $$\frac{A - (B \times \text{Factor})}{A}$$

displayed on a readout. While this is less sophisticated, it would be possible to cut metal sheets having a configuration as that of metal sheet 22'. It may also be seen that the same result is obtained by pivoting the structure supporting guide rolls 12 and 14, measuring rolls 36 and 38 and pulse generators 40 and 42 thru an angle α thereby placing the center of curvature 54 on the extension of the center of shear blades 48.

As shown in FIG. 5, the camber measuring apparatus 32' may be modified to be used with a leveling apparatus 80, such as the apparatus disclosed in Bradlee U.S. Pat. No. 4,635,458, the disclosure of which is incorporated herein by reference. With this embodiment, pulse generators 40, 42 generate signals which are conducted to a computer 44'. The computer 44' calculates camber using equation (8) and activates the leveling apparatus 80 to skew the work rolls, generally designated 82, relative to each other to lengthen one side or the other of the strip 10. This having been done, the strip may be recoiled or cut into sheets by a method such as that shown in FIG. 1.

Figure 6:
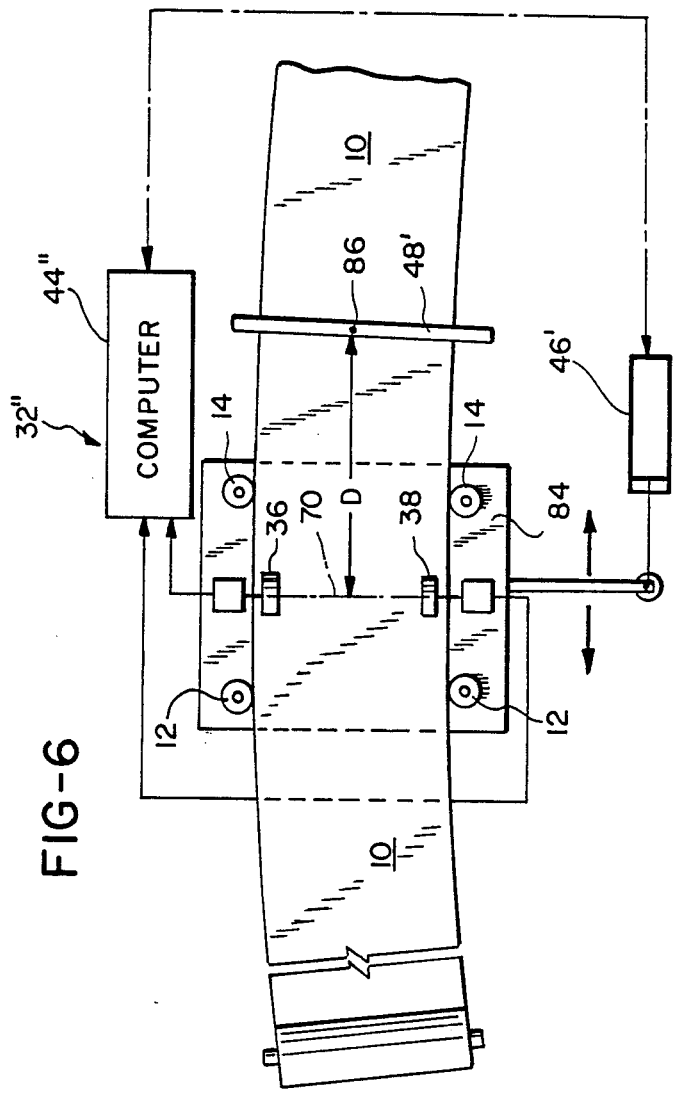
FIG. 6 is a schematic representation of an alternate embodiment of an apparatus for performing the method of the invention.

An alternate device 32" for carrying out the invention is shown in FIG. 6. The pairs of guide rolls 12, 14 and measuring wheels 36, 38 are mounted on a pivotable table 84 which is pivoted by a double-acting cylinder motor 46' that is activated by the computer 44'. The shearing blade 48' is nonpivoting and is capable of movement only in the vertical direction. The center 86 of the blade is positioned a distance D from the center 70 of the guides with the apparatus 32", the computer 44" calculates camber using equation (8) and the pivot angle using equation (9). The cylinder motor 46' is activated by the computer 44" to pivot the table 84 such that the guides 12, 14, and centerline 70, are pivoted the angle α relative to the fixed blade 48'. This, in turn, acts to pivot the sheet 10 to the appropriate angle relative to blade 48'. The final step is to cut the strip 10 into the desired section.

While the forms of apparatus herein described constitute preferred embodiments of the invention, it is to be understood that the invention is not limited to these precise forms of apparatus, and that changes may be made therein without departing from the scope of the invention.

What is claimed is:

1. A method of measuring camber in a sheet of metallic material having upper and lower surfaces and first and second longitudinal edges and a width W comprising the steps of:
   (a) displacing said sheet in a path between fixed guides in a plane of said sheet perpendicular to said width such that a point on a center of said sheet travels a predetermined distance past a datum line perpendicular to said path, said sheet being directed by engaging said edges against said guides;
   (b) measuring a length of said sheet adjacent to said first longitudinal edge thereof which moves past said datum line when said sheet is displaced said predetermined distance by bringing a first measuring wheel into contact with said sheet on one of said surfaces adjacent to but spaced from said first longitudinal edge and generating a first number of pulses proportional to an amount of rotation of said first wheel, said first number of pulses having a value A proportional to said first edge length;
   (c) measuring a length of said sheet adjacent to said second, opposite longitudinal edge whereof which moves past said datum line when sheet when sheet is displaced said predetermined distance by bringing a second measuring wheel into contact with said sheet on one of said surfaces adjacent to but spaced from said second longitudinal edge and generating a second number of pulses proportional to an amount of rotation of said second wheel, said second number of pulses having a value B proportional to said second edge length; and
   (d) calculating camber at a centerline of said sheet, expressed as a radius of curvature $R_C$ of said sheet, by the equation $$R_C = W\left(\frac{A}{A-B}\right).$$

2. The method of claim 1 further comprising the final steps of: (e) pivoting a pivotable shearing blade to an angle $\alpha$ with respect to said datum line, said angle $\alpha$ being equal to $D/R_C$ where D is the distance from a center of said guides to a pivot center of said shear blade, and (f) severing a sheet from said strip with said blade.

3. The method of claim 1 further comprising the final steps of: (e) pivoting a structure supporting said fixed guides to an angle $\alpha$ with resepct to a shear blade, said angle $\alpha$ being equal to $D/R_C$ where D is a distance from a center of said guides to a center of said shearing blade; and (f) severing a sheet from said strip with said blade.

4. The method of claim 1 further comprising the final step of: (e) adjusting work rolls of a leveling apparatus to deform a shorter longitudinal side of said strip by a larger amount than a longer longitudinal side thereof, thereby making said sides uniform in length.

* * * * *